United States Patent
Sasaki

(10) Patent No.: US 10,998,812 B2
(45) Date of Patent: May 4, 2021

(54) DETECTION DEVICE, CONTROL DEVICE, AND INVERTER DEVICE

(71) Applicant: FUJI ELECTRIC CO., LTD., Kanagawa (JP)

(72) Inventor: Masahiro Sasaki, Azumino (JP)

(73) Assignee: FUJI ELECTRIC CO., LTD., Kanagawa (JP)

( * ) Notice: Subject to any disclaimer, the term of this patent is extended or adjusted under 35 U.S.C. 154(b) by 0 days.

(21) Appl. No.: 16/528,649

(22) Filed: Aug. 1, 2019

(65) Prior Publication Data

US 2019/0356218 A1 Nov. 21, 2019

Related U.S. Application Data

(63) Continuation of application No. PCT/JP2018/023707, filed on Jun. 21, 2018.

(30) Foreign Application Priority Data

Aug. 29, 2017 (JP) .............................. JP2017-164557

(51) Int. Cl.
*H02M 1/32* (2007.01)
*H01F 27/42* (2006.01)
(Continued)

(52) U.S. Cl.
CPC ............ *H02M 1/32* (2013.01); *H01F 27/427* (2013.01); *H02M 7/53803* (2013.01); *H02M 2001/0009* (2013.01)

(58) Field of Classification Search
CPC . H02M 2007/4803; H02M 2007/4822; H02M 7/42; H02M 7/48; H02M 7/487;
(Continued)

(56) References Cited

U.S. PATENT DOCUMENTS 7,800,928 B1 * 9/2010 Dernovsek ............ H02M 7/523
363/132
9,397,658 B2 7/2016 Sicard
(Continued)

FOREIGN PATENT DOCUMENTS

CN 103036547 A 4/2013
CN 103220855 A 7/2013
(Continued)

OTHER PUBLICATIONS

International Search Report and (ISA/237) Written Opinion of the International Search Authority for International Patent Application No. PCT/JP2018/023707, dated by the Japan Patent Office on Sep. 11, 2018.
(Continued)

*Primary Examiner* — Bryan R Perez

(57) ABSTRACT

A detection error occurs due to ripple when a current transformer detects zero cross of current. Provided is a detection device for detecting zero cross of output current output from switching circuit including a first switching element and a second switching element connected in series, and the detection device has: an acquisition unit which acquires an observation value that is based on gate current or an observation value based on gate voltage of at least one switching element of the first switching element and the second switching element, during Miller period in which Miller capacitance between a drain and a gate is charged; and a detection unit which detects zero cross of output current flowing between (i) output terminal between first switching element and second switching element and (ii) a load connect to output terminal, based on observation value during Miller period.

20 Claims, 12 Drawing Sheets

(51) Int. Cl.
*H02M 7/538* (2007.01)
*H02M 1/00* (2006.01)

(58) Field of Classification Search
CPC .... H02M 7/501; H02M 7/4826; H02M 7/497; H02M 7/49; H02M 7/4807; H02M 7/537; H02M 7/5387; H02M 7/53; H02M 7/533; H02M 3/1584; H02M 2003/1586; H03K 19/00346; H03K 19/00353; H03K 19/00361; H03K 19/003; H03K 19/00307; H03K 19/00315; H03K 17/161; H03K 17/302; H03K 17/56; H03K 17/567; H03K 17/60; H03K 17/687; H03K 17/6871; H03K 17/16; H03K 17/30; H03K 17/601; H03K 17/64; H03K 17/691; H03K 17/731; H03K 17/10; H03K 17/102; H03K 17/107; H03K 17/12; H03K 17/122; H03K 17/127; H04L 25/026; G11B 5/02; G11B 5/022

See application file for complete search history.

(56) References Cited

U.S. PATENT DOCUMENTS

| | | | |
|---|---|---|---|
| 10,164,551 | B2 | 12/2018 | Yamakawa |
| 2003/0180997 | A1* | 9/2003 | Nakayama ....... H03K 17/08128 438/200 |
| 2006/0044025 | A1 | 3/2006 | Grbovic |
| 2010/0253267 | A1* | 10/2010 | Kitanaka ............... B60L 3/0023 318/400.26 |
| 2013/0082741 | A1 | 4/2013 | Domes |
| 2013/0162284 | A1 | 6/2013 | Kisslinger Da Silva |
| 2013/0264964 | A1 | 10/2013 | Luo |
| 2013/0307505 | A1 | 11/2013 | Daniel |
| 2016/0241162 | A1* | 8/2016 | Yamakawa ........... H02M 3/158 |
| 2017/0222560 | A1 | 8/2017 | Babazadeh |
| 2017/0338812 | A1* | 11/2017 | Hokazono ............ H03K 17/223 |

FOREIGN PATENT DOCUMENTS

| | | |
|---|---|---|
| CN | 103427604 A | 12/2013 |
| CN | 103825469 A | 5/2014 |
| CN | 105896967 A | 8/2016 |
| CN | 106602858 A | 4/2017 |
| JP | 2010093885 A | 4/2010 |
| JP | 2015080294 A | 4/2015 |
| WO | 2015008461 A1 | 1/2015 |

OTHER PUBLICATIONS

Office Action issued for counterpart Chinese Application 201880009658.5, issued by the China National Intellectual Property Administration dated Aug. 31, 2020.

* cited by examiner

DETECTION DEVICE, CONTROL DEVICE, AND INVERTER DEVICE

The contents of the following Japanese patent application are incorporated herein by reference:
NO. 2017-164557 filed in JP on Aug. 29, 2017
PCT/JP2018/023707 filed on Jun. 21, 2018

BACKGROUND

1. Technical Field

The present invention relates to a detection device, a control device, and an inverter device.

2. Related Art

Conventionally, in a switching circuit having two switching elements connected in series, a current transformer has been used to observe an input current or output current into/from the switching circuit and to detect a zero cross timing thereof (refer to Patent Document 1, for example).

[Patent document 1] Japanese Patent Application Publication No. 2015-80294

However, when the current transformer is used to detect a zero cross of the current, a detection error occurs due to ripple and it may be difficult to detect the accurate timing.

SUMMARY

[Item 1] To resolve the above-described problem, a first aspect of present invention provides a detection device which detects zero cross of the output current output from the switching circuit having a first switching element and the second switching element connected in series. The detection device may comprise an acquisition unit which acquires observation value based on gate voltage or observation value based on gate current, during a Miller period in which a Miller capacitance between a drain and a gate is charged, of at least one of switching element among the first switching element and the second switching element. The detection device may comprise, based on the observation value during the Miller period, a detection unit which detects zero cross of the output current flowing between an output terminal between the first switching element and the second switching element and a load connected to the output terminal.

[Item 2] The switching circuit may be connected in series to the first switching element on a low side and the second switching element on a high side. The acquisition unit may acquire observation value from the first switching element.

[Item 3] The detection unit may detect zero cross based on a result of comparing the observation value with threshold value.

[Item 4] The detection device may comprise an AD conversion unit which converts the analog observation value acquired by the acquisition unit into a digital observation value and supplies the observation value to the detection unit.

[Item 5] The detection unit may detect the zero cross based on a result of comparing the digital observation value with a predetermined reference value stored therein.

[Item 6] The detection unit may have a prediction unit which calculates and predicts a predicted value of a subsequent digital observation value from a history of the past digital observation values. The detection unit may detect the zero cross based on the result of comparing the predicted value with the threshold value.

[Item 7] The prediction unit may calculate the predicted value from an approximate function of relationship between observation value of a most recent plurality of digital value and an acquiring timing of respective observation value.

[Item 8] The prediction unit may calculate the predicted value using a temporal change rate of the most recent two digital observation values as a temporal change rate from the most recent digital observation value to the predicted value.

[Item 9] The detection unit may have a prediction unit which calculates the predicted value of the subsequent temporal change rate from a history of temporal change rate of the past digital observation values. The detection unit may detect the zero cross based on the result of comparing the predicted value with the threshold value.

[Item 10] The detection unit may use at least one of a maximum value and a minimum value of the temporal change rate of digital observation value as threshold value.

[Item 11] At least one switching element may undergo a plurality of switching operations during a variation period of the output current. The detection unit may detect whether or not the output current has zero crossed in each of two or more of the plurality of switching operations.

[Item 12] The detection unit may detect, at every switching operation that at least one switching element undergoes to at least one of an ON state and an OFF state, whether or not the output current has zero crossed, or is to zero cross.

[Item 13] The acquisition unit may have a differentiation unit which differentials the gate voltage or the gate current. The acquisition unit may have an identification unit which identifies the Miller period based on the differential value of the gate voltage or the gate current. The acquisition unit may have a sampling unit which samples the observation value during the Miller period.

[Item 14] The sampling unit may have a sampling capacitor which accumulates the observation value. The sampling unit may have a sampling switch which connects between a terminal which outputs the observation value during the Miller period and the sampling capacitor, and disrupts between a terminal which outputs the observation value in a period other than the Miller period and the sampling capacitor. The sampling unit may have an output buffer which outputs the observation value accumulated in the sampling capacitor to the detection unit.

[Item 15] The acquisition unit may sample the observation value at a timing when a predetermined time has elapsed from an On instruction forward at least one switching element.

[Item 16] A second aspect of the present invention provides a control device. The control device may comprise the detection device of the first aspect of present invention. The control device may comprise a determination unit which determines positive or negative of the output current according to a zero cross timing detected by detection device. The control device may comprise a control unit which controls switching operation of the switching circuit. The control device may comprise a compensation unit which compensates a dead time of the switching circuit according to positive or negative of the output current.

[Item 17] The switching circuit may comprise the first switching element on low side and the second switching element on the high side connected in series. The compensation unit may increase an ON period of the first switching element and an OFF period of the second switching element in response to the output current having been determined to be positive, and increases an OFF period of the first switching element and an ON period of the second switching element in response to the output current having been determined to be negative.

[Item 18] The control unit may control the switching circuit to have output value of the output terminal can approach target value by PWM control. The compensation unit may relatively increase the target value by dead time compensation value relative to the output value in response to the output current having been determined to be positive, and relatively decrease the target value by dead time compensation value relative to the output value in response to the output current having been determined to be negative.

[Item 19] In a third aspect of the present invention an inverter device is provided. The inverter device may comprise the control device in the second aspect of the present invention. The inverter device may comprise the switching circuit.

The summary clause does not necessarily describe all necessary features of the embodiments of the present invention. The present invention may also be a sub-combination of the features described above.

BRIEF DESCRIPTION OF THE DRAWINGS

FIG. 4 shows a relationship between output current and gate voltage upon turn-on.

FIG. 5 shows the relationship between the output current and gate current upon turn-on.

DESCRIPTION OF EXEMPLARY EMBODIMENTS

Hereinafter, (some) embodiment(s) of the present invention will be described. The embodiment(s) do(es) not limit the invention according to the claims. Moreover, all the combinations of the features described in the embodiment(s) are not necessarily essential to solutions provided by aspects of the invention.

First Embodiment

Figure 1:
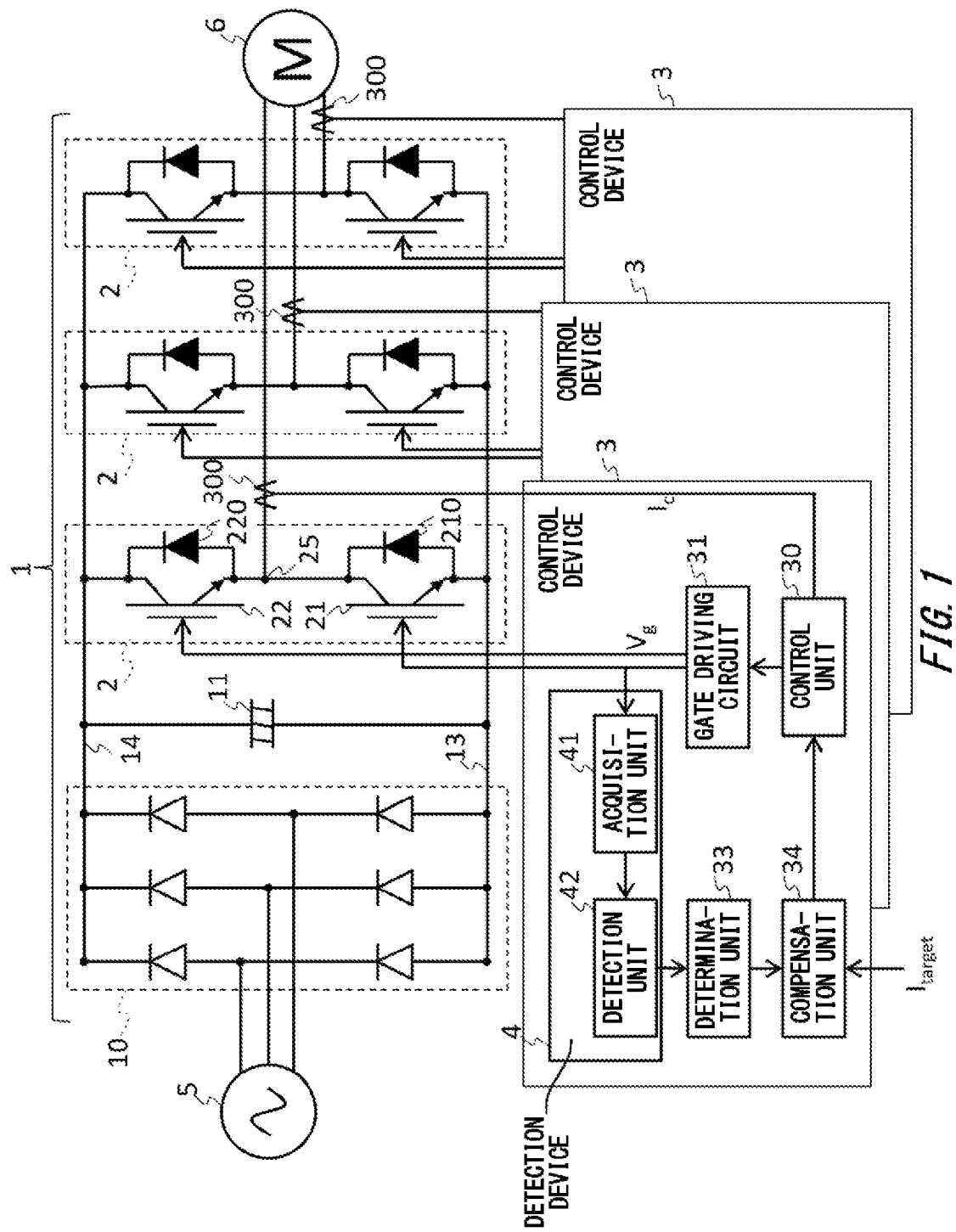
FIG. 1 shows an inverter device according to a first embodiment.

FIG. 1 shows an inverter device 1 according to the present embodiment with an AC power supply 5 and a load 6.

The AC power supply 5 can supply the inverter device 1 with AC power (three-phase AC power as one example in the present embodiment). For example, AC power supply 5 may be a commercial power supply of 200V or 400V.

The load 6 is an electronic component supplied with power from the inverter device 1. In the present embodiment, the load 6 is a three-phase motor as one example.

The inverter device 1 includes a rectifying circuit 10, a smoothing capacitor 11, one or more (a total of three, one for each phase as one example in the present embodiment) switching circuit(s) 2 and one or more (a total of three, one for each phase as one example in the present embodiment) control device(s) 3.

The rectifying circuit 10 rectifies AC current which is supplied from AC power supply 5. The rectifying circuit 10 may be a multiphase full-wave rectifying circuit, and is a three-phase full-wave rectifying circuit as one example in the present embodiment. The rectifying circuit 10 has two rectifier diodes which are connected in series between a high-side wire 14 and a low-side wire 13 for each phase of UVW. The rectifying circuit 10 supplies DC power which is obtained by rectification to the high-side wire 14 and low-side wire 13.

The smoothing capacitor 11 is connected in parallel between the high-side wire 14 and low-side wire 13, and smoothes the voltage between the high-side wire 14 and low-side wire 13.

The switching circuit 2 has a first switching element 21 and a second switching element 22. The first switching element 21 and the second switching element 22 are connected in series between the high-side wire 14 and the low-side wire 13 with the first switching element 21 on the low side and the second switching element 22 on the high side. An output terminal 25 is provided between the first switching element 21 and the second switching element 22 and connected to the load 6, so as to output power of any one of among the UVW phases.

The first switching element 21 and the second switching element 22 are IGBTs as one example in the present embodiment, but may be other elements such as MOSFET and Bipolar transistor. The first switching element 21 and the second switching element 22 may be respectively provided with a freewheeling diode 210 and a freewheeling diode 220 whose cathode is on the high side. An operation frequency of the first switching element 21 and the second switching element 22 is high frequency such as 10 kHz, for example. The first switching element 21 and the second switching element 22 may include a wide band gap semiconductor. The wide band gap semiconductor herein means, a semiconductor having a larger band gap than a silicon semiconductor, for example, a semiconductor such as SiC, GaN, diamond, AlN, AlGaN or ZnO.

Each of the control devices 3 is connected to the switching circuit 2 of the corresponding phase among the UVW phases. Each of the control devices 3 comprises a control unit 30, a gate driving circuit 31, a detection device 4, a determination unit 33, and a compensation unit 34.

The control unit 30 controls the switching operation of the switching circuit 2. For example, the control unit 30 switches at least one of the first switching element 21 and the second switching element 22 for a plurality of times during a variation period of output current $I_c$ from the output terminal 25. As one example the control unit 30 controls the switching circuit 2 by the PWM control.

Also, the control unit 30 performs feedback control so that the output value of the output terminal 25 can approach the target value. In the present embodiment, as one example, the output value and the target value represent current value. For example, the control unit 30 may control the switching circuit 2 such that the output current $I_c$ which is measured by a current sensor 300 provided between the output terminal 25 and the load 6 can approach target current $I_{target}$, which is input into the control device 3. The control unit 30 supplies an on/off control signal for the first switching element 21 and the second switching element 22 to gate driving circuit 31.

The gate driving circuit 31 drives the gates for the first switching element 21 and the second switching element 22 based on the control signal input thereto. Between the gate driving circuit 31 and the gates of the first switching element 21 and the second switching element 22, a gate resistance 310 may exist (refer to FIG. 2)

The detection device 4 detects zero cross of the output current $I_c$. For example, the detection device 4 may detect whether or not the output current $I_c$ is zero or near zero. The detection device 4 has an acquisition unit 41 and a detection unit 42.

The acquisition unit 41 acquires an observation value $V_{ic}$ that is based on gate voltage $V_g$ during a Miller period in the first switching element 21. The Miller period herein means a period in which the Miller capacitance between the drain and the gate is charged when the switching element is turned on. In the Miller period, the gate voltage $V_g$ is clamped to a fixed value (Miller voltage, gate plateau voltage or gate clamp voltage). The observation value $V_{ic}$ based on the gate voltage $V_g$ during the Miller period means a value which depends on the magnitude of the gate voltage $V_g$ and is the gate voltage $V_g$ itself during the Miller period as one example in the present embodiment. Since the gate voltage $V_g$ is in a linear relationship with the output current $I_c$ during the Miller period, the observation value $V_{ic}$ based on the gate voltage $V_g$ during the Miller period is also in a linear relationship with the output current $I_c$. The acquisition unit 41 supplies the acquired observation value $V_{ic}$ to the detection unit 42.

The detection unit 42 detects the zero cross of the output current $I_c$ based on the observation value $V_{ic}$. The zero cross of the output current $I_c$ can be detected based on the observation value $V_{ic}$ because the observation value $V_{ic}$ and the output current $I_c$ are in a linear relationship.

When the plurality of switching operations are performed in the variation period of the output current $I_c$, the detection unit 42 may detect, whether or not the output current $I_c$ has zero crossed in each of two or more of the plurality of switching operations. As one example the detection unit 42 may detect, at every switching operation to the ON state and/or the OFF state in the first switching element 21, whether or not the output current $I_c$ has zero crossed. Note that the detection unit 42 may detect whether or not the output current $I_c$ is to zero cross.

The detection unit 42 supplies the detection result to the determination unit 33. For example, the detection unit 42 may supply a detection signal which becomes high when the zero cross is detected to the determination unit 33.

The determination unit 33 determines whether the output current $I_c$ positive or negative according to the time point of the zero cross detected by the detection device 4. For example, the determination unit 33 determines that the output current $I_c$ is positive or negative alternately every time the zero cross is detected. The determination unit 33 may determine positive or negative from the measurement result of the current sensor 300. Note that the output current $I_c$ flowing toward the load 6 from the output terminal 25 is determined to be positive, as one example in the present embodiment. The determination unit 33 supplies determination result to the compensation unit 34.

The compensation unit 34 compensates dead time of the switching circuit 2 according to whether the output current $I_c$ is positive or negative. The dead time herein means time for temporarily turn off both of the first switching element 21 and the second switching element 22 to prevent short-through current.

For example, the compensation unit 34 increases an ON period of the first switching element 21 and an OFF period of the second switching element 22 in response to the output current $I_c$ having been determined to be positive and increases an OFF period of the first switching element 21 and an ON period of the second switching element 22 in response to the output current $I_c$ having been determined to be negative. Alternatively, the compensation unit 34 relatively increases target current $I_{target}$, which is input to the control device 3, by dead time compensation value relative to the output current $I_c$ in response to the output current $I_c$ having been determined to be positive, relatively decreases the target current $I_{target}$ by dead time compensation value relative to the output current $I_c$ in response to the output current $I_c$ having been determined to be negative and supplies the resulting target current $I_{target}$ to the control unit 30. As a result, an output waveform distortion caused by providing dead time is compensated for. The dead time compensation value herein means a compensation value for the output current $I_c$ for eliminating the output waveform distortion accompanying the provision of dead time. As the dead time compensation value, a value calculated by conventionally well-known method may be used, such as the value described in the above-mentioned Patent document 1, for example.

According to the inverter device 1 above, the zero cross of the output current is detected based on the observation value $V_{ic}$ which is based on the gate voltage $V_g$ of the first switching element 21 during the Miller period. Therefore as is different from the conventional cases in which a current transformer is used to detect the zero cross of the output current $I_c$, a detection error due to ripple is prevented from occurring. Accordingly, the zero cross can be accurately detected.

Also, since dead time compensation is performed by using accurate zero cross timing, the output waveform distortion caused by providing the dead time can be reliably compensated.

Figure 2:
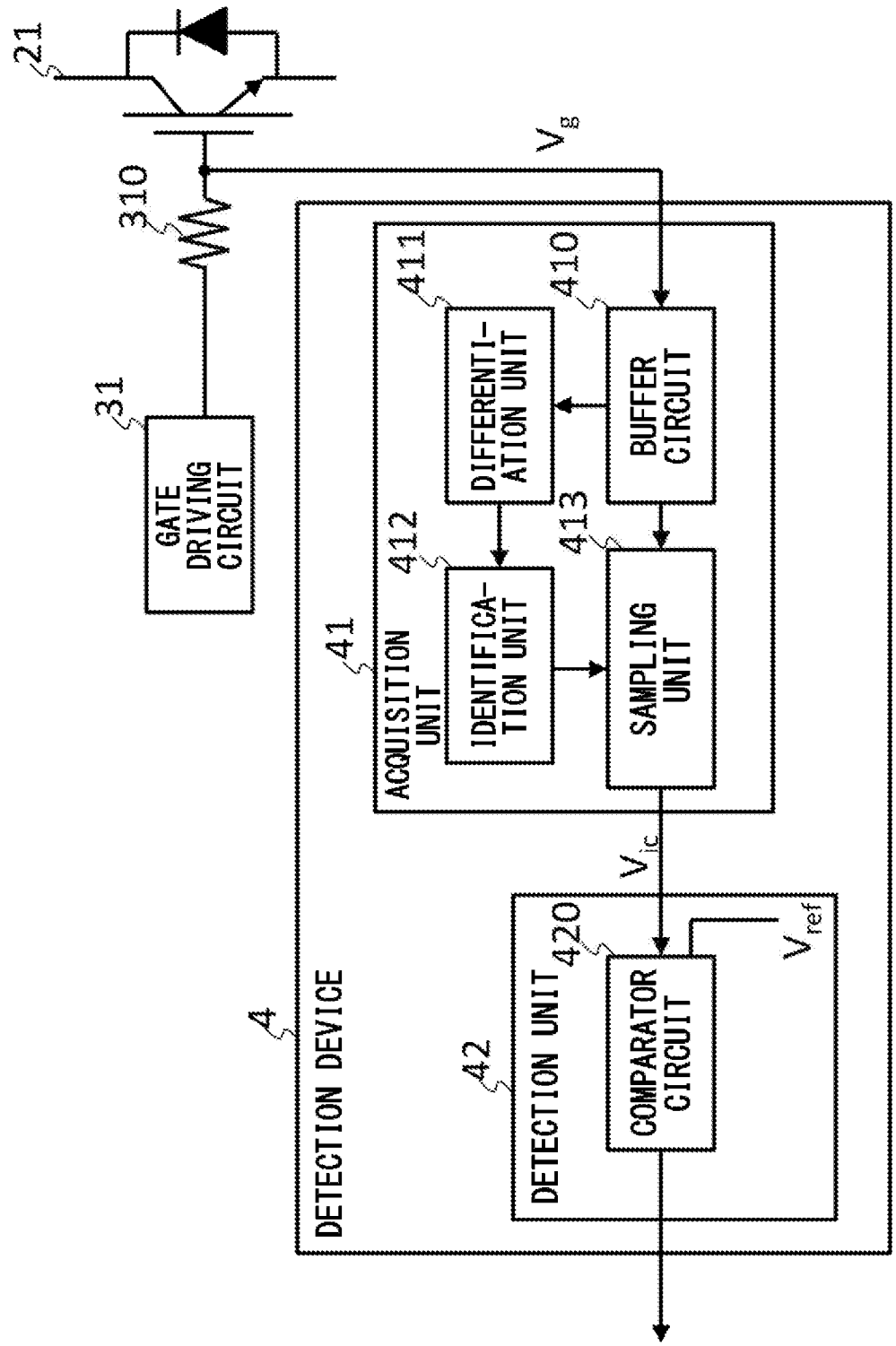
FIG. 2 shows an acquisition unit and a detection unit of the detection device.

FIG. 2 shows an acquisition unit 41 and a detection unit 42 of a detection device 4. The acquisition unit 41 has a buffer circuit 410, a differentiation unit 411, an identification unit 412 and a sampling unit 413.

The buffer circuit 410 buffers and supplies gate voltage $V_g$ to the differentiation unit 411 and the sampling unit 413. A gain of the buffer circuit 410 may be 1 or may be a value of other than 1.

The differentiation unit 411 differentials the gate voltage $V_g$. For example, the differentiation unit 411 may differential the gate voltage $V_g$ by time. In this case, the differential value shows an inclination of a graph showing temporal change of the gate voltage $V_g$. The differentiation unit 411 may supply a differential value of the gate voltage $V_g$ to the identification unit 412.

The identification unit 412 identifies the Miller period based on the differential value of the gate voltage $V_g$. For example, the identification unit 412 may identify the Miller period according to whether the differential value is zero or not. The identification unit 412 supplies the identification result to the sampling unit 413. For example, the identification unit 412 may supply a signal which becomes high during the Miller period to the sampling unit 413.

The sampling unit 413 samples the observation value $V_{ic}$ during the Miller period. For example, the sampling unit 413 may sample the gate voltage $V_g$ at least one time point during the Miller period as the observation value $V_{ic}$. The sampling unit 413 may hold the sampled observation value $V_{ic}$ until the next sampling. The sampling unit 413 supplies the sampled observation value $V_{ic}$ to the detection unit 42.

The detection unit 42 has a comparator circuit 420. The comparator circuit 420 detects a zero cross of the output current $I_c$ based on a result of comparing the observation value $V_{ic}$ with a threshold value $V_{ref}$. For example, the comparator circuit 420 may be determined to have a zero cross occurred therein in response to that the observation value $V_{ic}$ being equal to or lower than the threshold value $V_{ref}$.

The threshold value $V_{ref}$ may be a voltage value $V_{ic\ @\ Ic=0A}$ sampled in advance when the output current $I_c$ may be zero, or may be a voltage value $V_{ic\ @\ Ic=0A}$+K which a tolerance margin K is added thereto. The value of the tolerance margin K may be empirically set to a particular value. In the present embodiment, the detection unit 42 detects the zero cross based on the observation value $V_{ic}$ from the first switching element 21 on low side, and therefore a lower voltage value is used as threshold value $V_{ref}$ compared to the case in which the zero cross is detected based on the observation value $V_{ic}$ of the second switching element 22 on the high side.

According to the detection device 4 above, the observation value $V_{ic}$ is sampled during the Miller period and therefore the observation value $V_{ic}$ which is in the linear relationship with the output current $I_c$ can be sampled. Therefore, the zero cross of the output current $I_c$ can be accurately detected.

Figure 3:
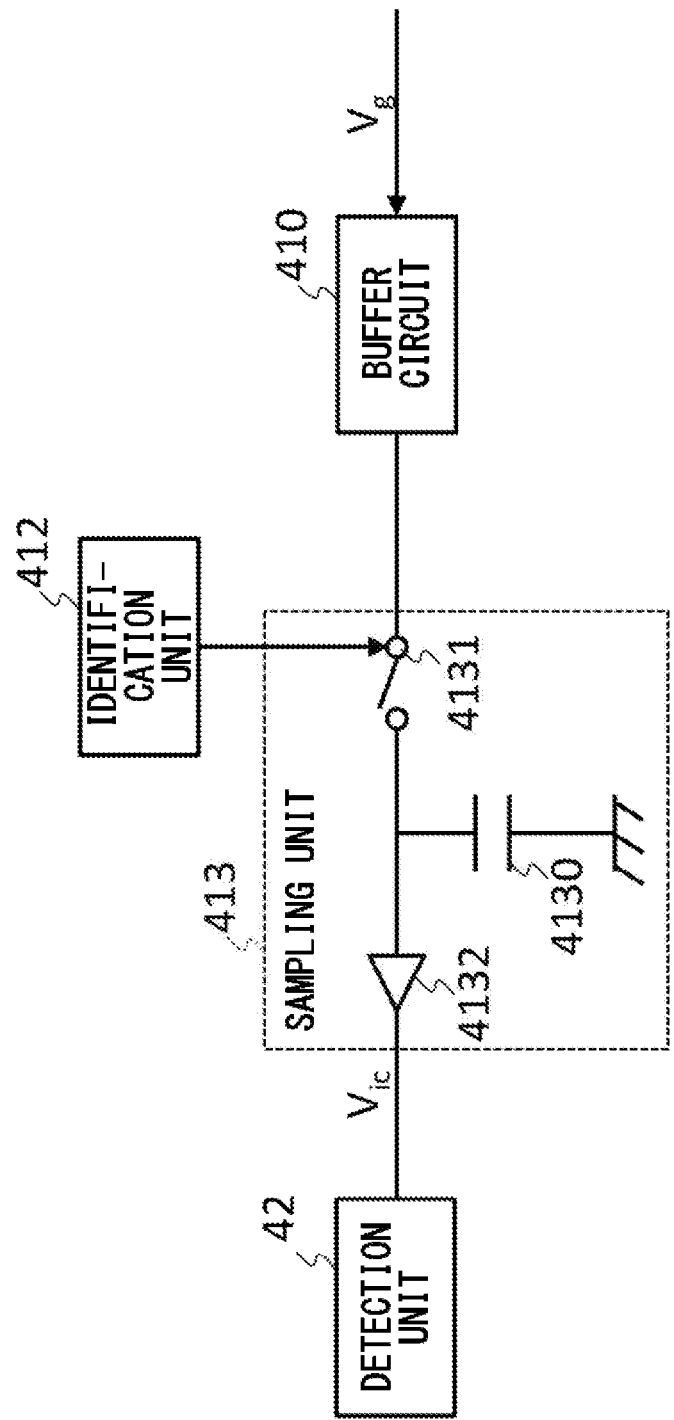
FIG. 3 shows a sampling unit.

FIG. 3 shows a sampling unit 413. The sampling unit 413 has a sampling capacitor 4130, a sampling switch 4131 and an output buffer 4132.

The sampling capacitor 4130 accumulates the observation value $V_{ic}$. In the present embodiment, the sampling capacitor 4130 is provided between a wiring which connects the buffer circuit 410 and the detection unit 42 and ground as one example.

The sampling switch 4131 is provided between the sampling capacitor 4130 and the buffer circuit 410. The sampling switch 4131 establishes connection between a terminal which outputs the gate voltage (in the present embodiment, an output terminal of the buffer circuit 410 as one example) and the sampling capacitor 4130 during the Miller period, and disrupts, in a period other than the Miller period, the connection between the output terminal and the sampling capacitor 4130. For example, the sampling switch 4131 may remain closed at least one point in time during the Miller period identified by the identification unit 412, and may remain opened during the period other than Miller period.

The output buffer 4132 is provided between the sampling capacitor 4130 and the detection unit 42. The output buffer 4132 outputs the observation value $V_{ic}$ which is accumulated in the sampling capacitor 4130 to the detection unit 42.

According to the sampling unit 413 above, a voltage which shows the observation value $V_{ic}$ during the Miller period is accumulated in the sampling capacitor 4130 and the voltage is held at the end of the Miller period.

Figure 4:
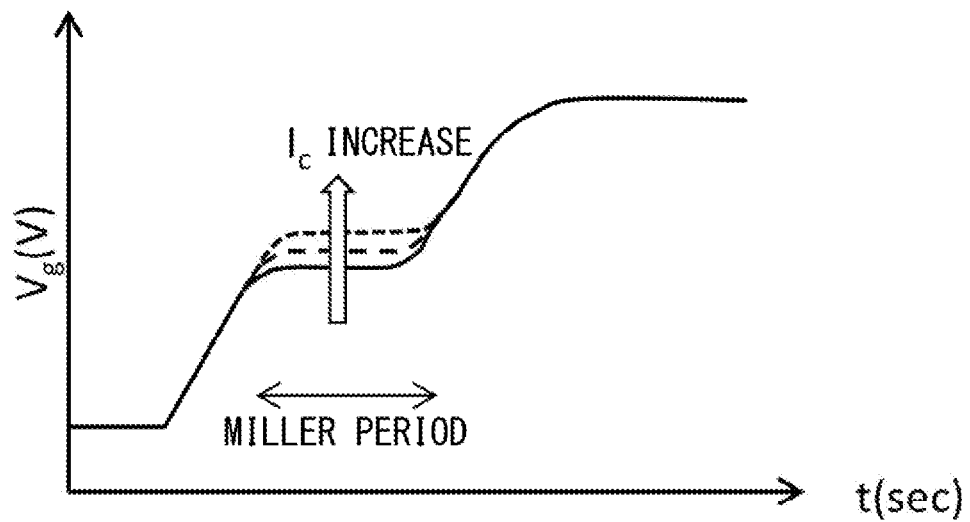

FIG. 4 shows a relationship between the output current $I_c$ and the gate voltage $V_g$ upon turn-on. In the figure, the vertical axis is voltage (V) and the horizontal axis is time (seconds).

The gate voltage $V_g$ is clamped to a fixed value during the Miller period. The gate voltage $V_g$ of the Miller period is in the linear relationship with the output current $I_c$ and as the output current $I_c$ increases, the gate voltage $V_g$ of the Miller period increases.

Figure 5:
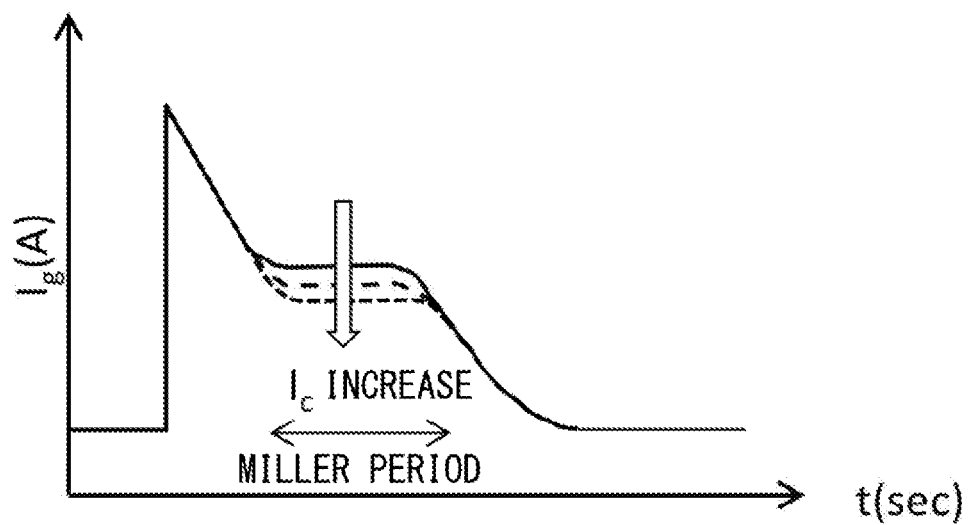

FIG. 5 shows a relationship between an output current $I_c$ and a gate current $I_g$ upon turn-on. In the figure, the vertical axis is current (A) and the horizontal axis is time (seconds).

The gate current $I_g$ is clamped to a fixed value during the Miller period. The gate current $I_g$ of the Miller period is in the linear relationship with the output current and as the output current $I_c$ increases, the gate current $I_g$ of the Miller period decreases.

Figure 6:
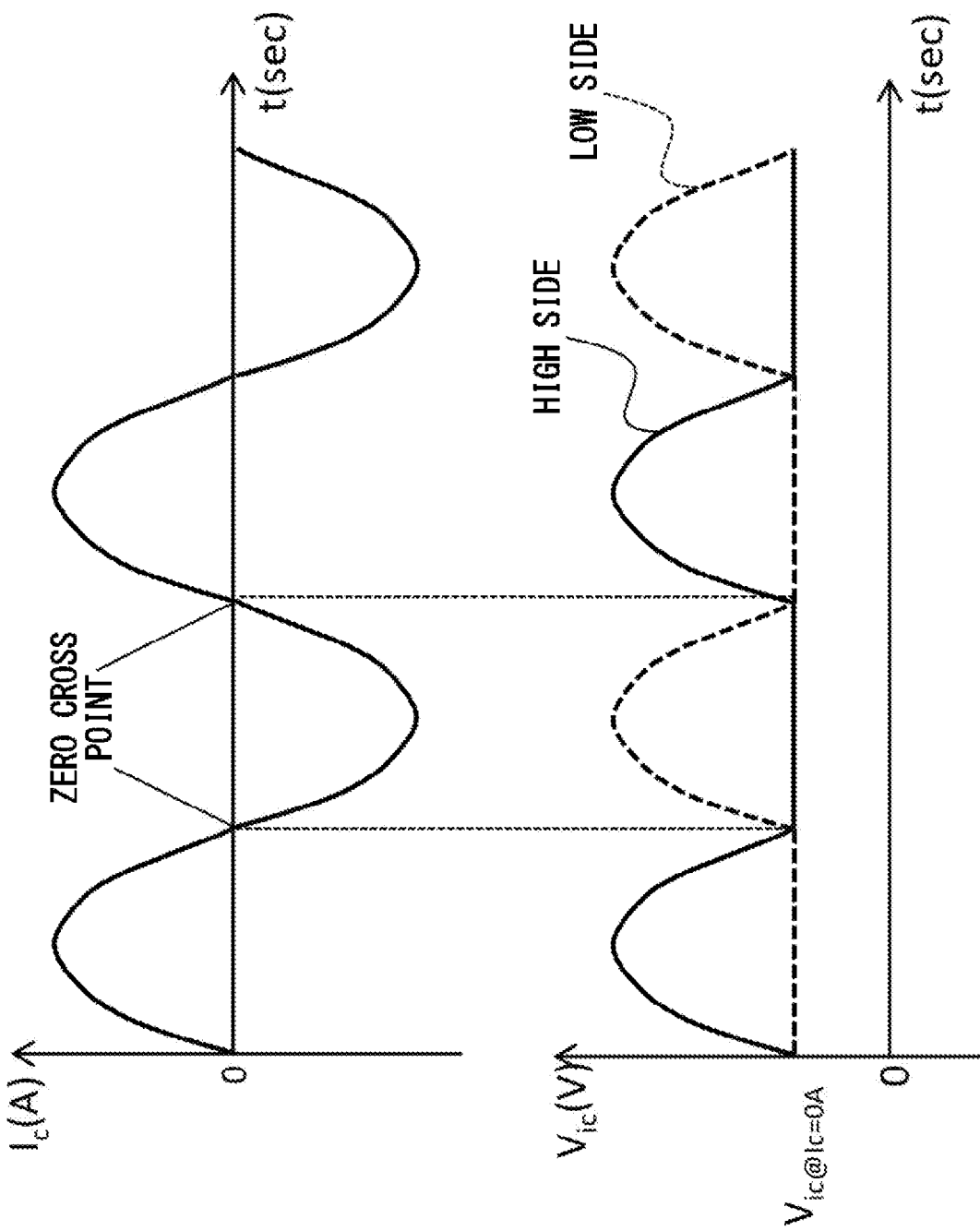
FIG. 6 shows the relationship between the output current and an observation value.

FIG. 6 shows a relationship between the output current $I_c$ and the observation value $V_{ic}$. The graph on the upper side shows the temporal change of the output current $I_c$. In this graph, the vertical axis represents the current (A) and the horizontal axis represents the time (seconds). The graph on the lower side shows the temporal change of the observation value $V_{ic}$ that is based on the gate voltage $V_g$ during the Miller period of the first switching element 21 on the low side and the second switching element 22 on the high side. In this graph, the vertical axis represents voltage (V) and the horizontal axis represents time (seconds). Note that an observation value $V_{ic}$ that is based on the gate voltage $V_g$ of the second switching element 22 on the high side is an observation value $V_{ic}$ acquired when the acquisition unit 41 is provided in the second switching element 22.

In the present embodiment, as one example, by controlling the first switching element 21 and the second switching element 22, the output current $I_c$ periodically fluctuates in a sine wave waveform.

When the output current $I_c$ is positive, current flows through the second switching element 22 on the high side and a freewheeling diode 210 of the first switching element 21 on the low side. Therefore, the observation value $V_{ic}$ of the second switching element 22 becomes a value which is in the linear relationship with the output current $I_c$. Also, the observation value $V_{ic}$ of the first switching element 21 is a voltage value $V_{ic\ @\ Ic=0A}$ that is observed when an output current $I_c$ is zero.

On the other hand, when the output current $I_c$ is negative, current flows through the first switching element 21 on the low side and a freewheeling diode 220 of the second switching element 22 on the high side. Therefore, the observation value $V_{ic}$ of the first switching element 21 is a value which is in the linear relationship with the output current $I_c$. Also, the observation value $V_{ic}$ of the second switching element 22 becomes voltage value $V_{ic\ @\ Ic=0A}$ when the output current $I_c$ is zero.

In this way, the observation value $V_{ic}$ of each of the first switching element 21 and the second switching element 22 becomes the voltage value $V_{ic\ @\ Ic=0A}$ at the zero cross point of the output current $I_c$ and the fluctuation pattern is different before and after that. Consequently, the zero cross of the output current $I_c$ can be detected according to whether the observation value $V_{ic}$ of at least one of the first switching element 21 and the second switching element 22 falls below equal to or lower than the threshold value $V_{ref}$ for example, voltage value $V_{ic\ @\ Ic=0A}$ or the voltage value $V_{ic\ @\ Ic=0A}$+K.

Figure 7:
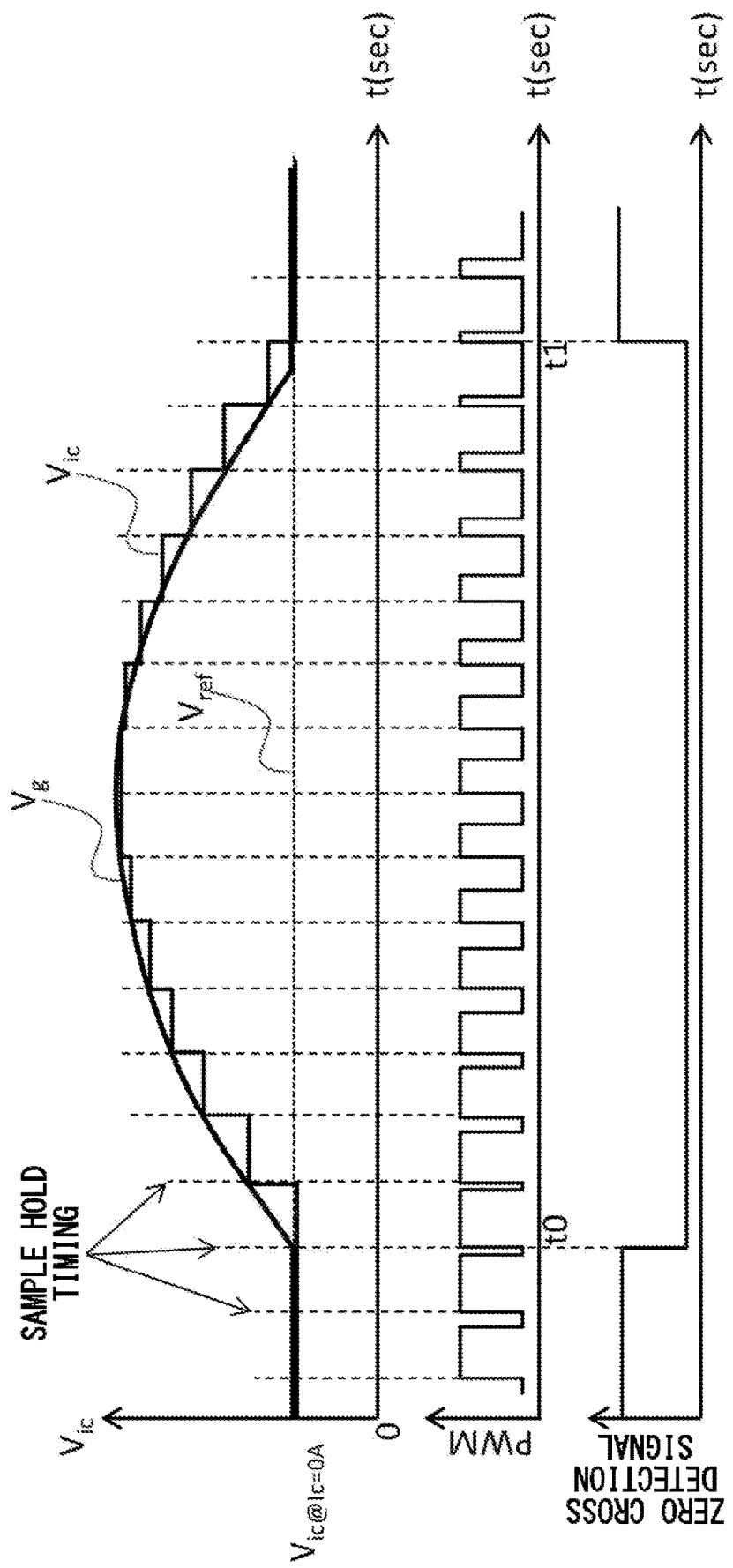
FIG. 7 shows an operating waveform of the detection device.

FIG. 7 shows an operating waveform of the detection device 4. A graph on the upper side shows a temporal change of the gate voltage $V_g$ and observation value $V_{ic}$ of the first switching element 21 on the low side. In this graph, the vertical axis is voltage (V) and the horizontal axis is time (seconds). A graph on the center shows a control signal of the first switching element 21 by the PWM control. When the control signal is high, the first switching element 21 becomes ON and when the control signal is low, the first switching element 21 becomes OFF. A graph on the lower side shows a detection signal which is output from the detection unit 42. The detection signal shows that a zero cross is detected when high, and shows that the zero cross is not detected when low.

First, as the control signal rises, the first switching element 21 is turned on and the Miller period starts. Next, the Miller period is identified by the identification unit 412, and the gate voltage $V_g$ is sampled and held by the sampling unit 413 at the sample hold timing during the period, and is supplied to the detection unit 42 as the observation value $V_{ic}$. Then the observation value $V_{ic}$ is compared with the threshold value $V_{ref}$ by the detection unit 42.

As a result, in the period up to a time t 0 in which the observation value $V_{ic}$ is equal to or lower than threshold value $V_{ref}$, the detection signal becomes high as it is determined that the zero cross has occurred. Also, in the period from time t0 to time t1 in which the observation value $V_{ic}$ is larger than the threshold value $V_{ref}$, the detection signal becomes low as it is determined that the zero cross has not occurred. In addition, in the period up to a time t 1 in which the observation value $V_{ic}$ becomes equal to or lower than threshold value $V_{ref}$, the detection signal becomes high regarding that the zero cross has occurred. As mentioned above, the zero cross of the output current $I_c$ is detected.

Second Embodiment

Figure 8:
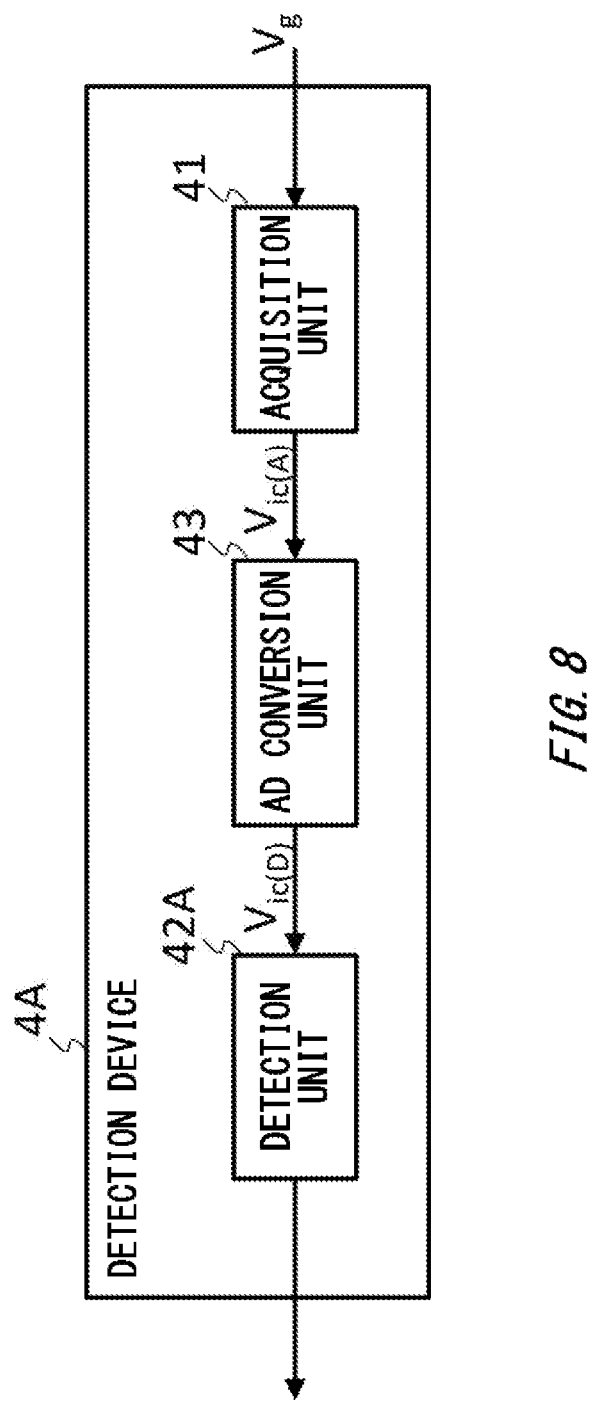
FIG. 8 shows a detection device according to a second embodiment.

FIG. 8 shows a detection device 4A according to the second embodiment. Note that almost the same configure as the inverter device 1 shown in FIG. 1 is attached with the same sign and the description is omitted. The detection device 4A has an AD conversion unit 43 and a detection unit 42A.

The AD conversion unit 43 converts the observation value $V_{ic}$ of analog value acquired by the acquisition unit 41 into a digital observation value $V_{ic}$ (also called observation value $V_{ic}$ (D)) and supply to the detection unit 42A. The AD conversion unit 43 may be in any type among pipe line type, flash type, successive approximation type, and delta-sigma type.

The detection unit 42A detects the zero cross of the output current $I_c$ based on a result of comparing the digital observation value $V_{ic}$ (D) with the threshold value stored therein. The threshold value may be the observation value $V_{ic}$ $(D)_{@Ic=0A}$ of digital value corresponding to voltage value $V_{ic}$ $(A)_{@Ic=0A}$ of analog value sampled in advance when the output current $I_c$ can be determined zero in the inverter device 1 including the detection device 4A, or may be the voltage value $V_{ic}$ $(D)_{@Ic=0A}$+K which is obtained by adding the tolerance margin K to the voltage value $V_{ic}$ $(D)_{@Ic=0A}$. The threshold value may be separately set in individual detection devices 4A. As a result, the influence of variation in characteristic among the detection devices 4A is reduced and the zero cross of the output current $I_c$ is accurately detected.

According to the detection device 4A above, the observation value which is converted from the analog value into the digital value is supplied to the detection unit 42A, and therefore a digital circuit can be used as the detection unit 42A.

Also, since the zero cross of the output current $I_c$ is detected based on the result of comparing with the threshold value stored therein, the zero cross of the output current $I_c$ can be accurately detected after preventing variation of threshold value due to noise unlike the case using input reference voltage or the like for comparison as the threshold value.

Third Embodiment

Figure 9:
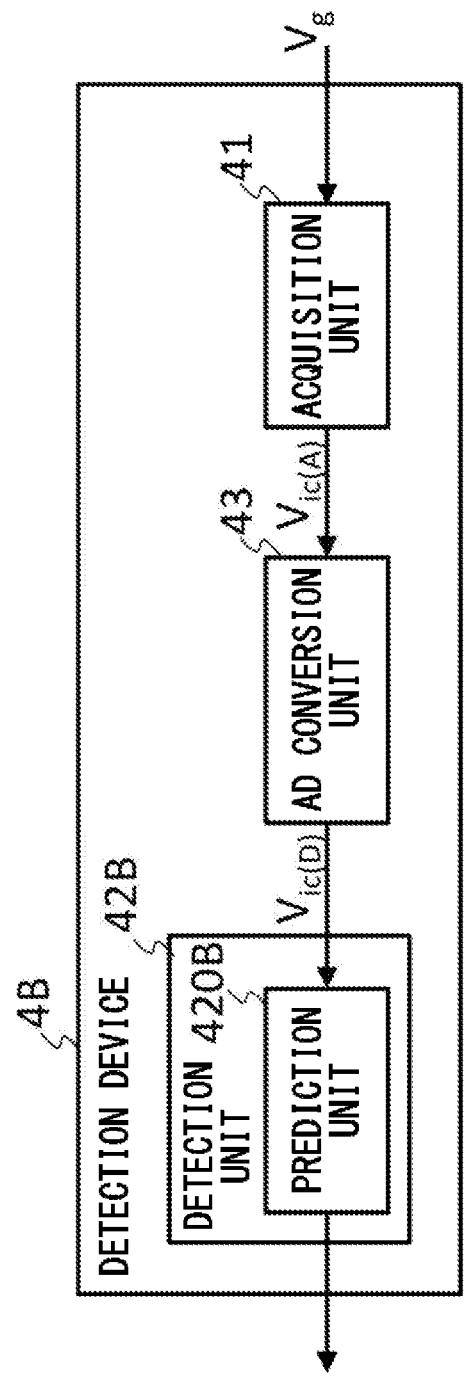
FIG. 9 shows a detection device according to a third embodiment.

FIG. 9 shows a detection device 4B according to the third embodiment. The detection device 4B has a detection unit 42B.

The detection unit 42B has a prediction unit 420B which calculates a predicted value $V_{ic}$ $(D_x)$ of the subsequent digital observation value $V_{ic}$ (D) from the history of the past digital observation values $V_{ic}$ (D) and detects the zero cross of the output current $I_c$ based on a result of comparing the predicted value $V_{ic}$ $(D_x)$ with the threshold value. The threshold value may be set in the same manner as the above-described second embodiment.

According to the detection device 4B above, the zero cross of the output current $I_c$ is detected by using the predicted value $V_{ic}$ $(D_x)$ of the observation value $V_{ic}$ (D), and therefore a zero cross detection timing can be advanced compared to the case in which the zero cross of the output current $I_c$ is detected based on the observation value $V_{ic}$ (D) which is actually measured. Also, since the predicted value $V_{ic}$ $(D_x)$ is calculated from the history of the observation values $V_{ic}$ (D), an influence of the measurement error of the observation value $V_{ic}$ (D) can be reduced by increasing the number of observation value $V_{ic}$ (D) being used for calculating the predicted value $V_{ic}$ $(D_x)$ and therefore the zero cross of the output current $I_c$ can be accurately detected.

Figure 10:
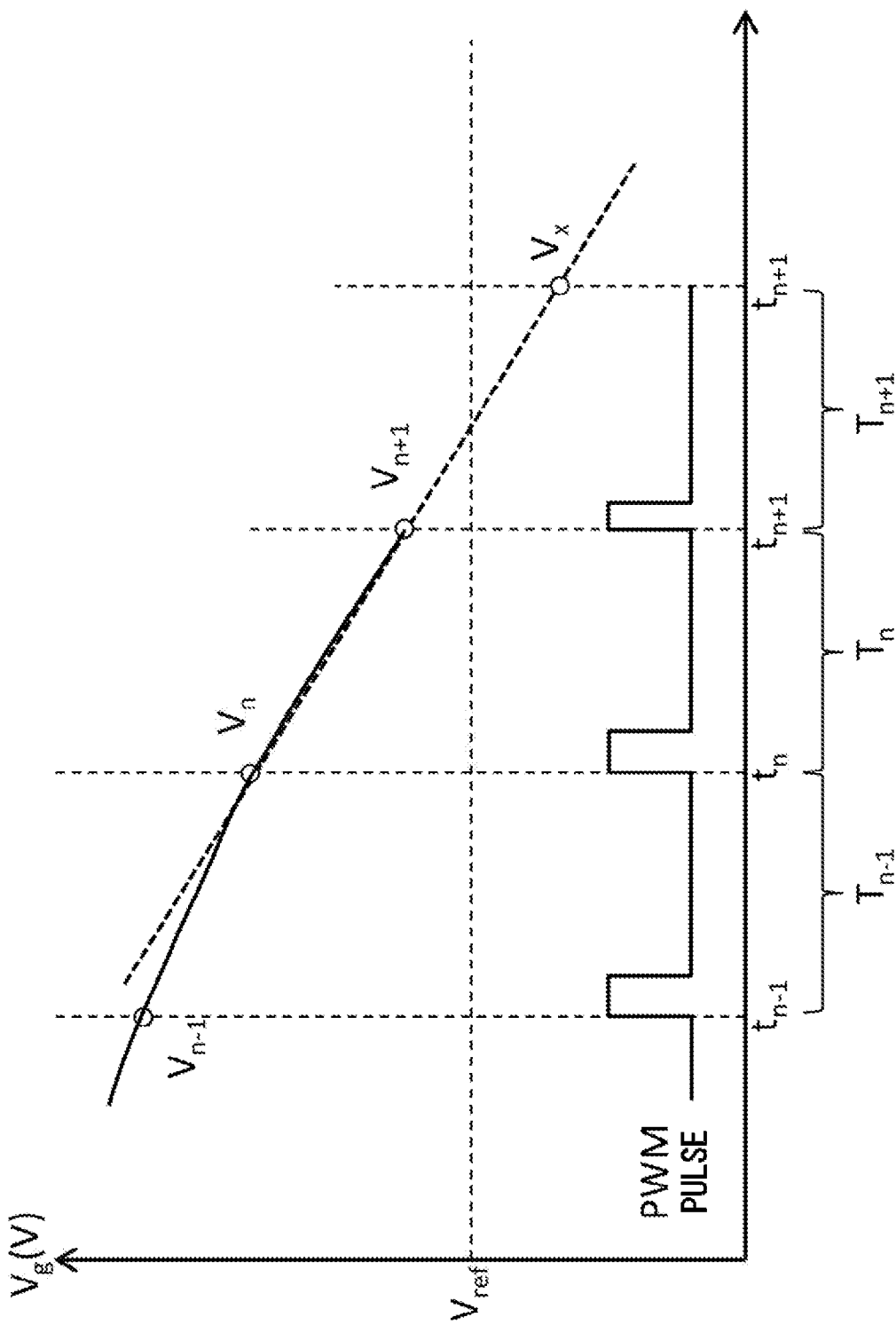
FIG. 10 shows an example calculation of a predicted value by a prediction unit.

FIG. 10 shows an example calculation of the predicted value $V_{ic}$ $(D_x)$ by the prediction unit 420B. Note that, in the present embodiment, the observation value $V_{ic}$ (D) is measured in the Miller period after rising of the pulse signal which performs PWM control on the switching element 21 (or the switching element 22) and intervals $T_{n-1}$, $T_n$, $T_{n+1}$ between the rising timings of each of pulse signals $t_{n-1}$, $t_n$, $t_{n+1}$ are equal.

The prediction unit 420B may calculate the predicted value $V_{ic}$ $(D_x)$ of the subsequent observation value $V_{ic}$ (D) from relationship of an approximate function among the most recent plurality of the digital observation value $V_{ic}$ $(D_n)$ value, . . . (however, the suffix "n" is a natural number showing the acquired order of the observation value $V_{ic}$ $(D_n)$) and an acquiring timing tn . . . of respective observation value $V_{ic}$ $(D_n)$. The approximate function may be a non-linear function and may be a linear function. As one example, the prediction unit 420B may calculate the predicted value $V_{ic}$ $(D_n)$ using the temporal change rate a of the observation value $V_{ic}$ $(D_n)$ and $V_{ic}$ $(D_{n+1})$ of the two most recent digital values as a temporal change rate from the observation value $V_{ic}$ $(D_{n+1})$ of the most recent digital value to the predicted value $V_{ic}$ $(D_x)$.

Here, when the temporal change rate a from the nth observation value $V_{ic}$ $(D_n)$ to the most recent (n+1)th observation value $V_{ic}$ $(D_{n+1})$ is used as a temporal change rate from the (n+1)th observation value $V_{ic}$ $(D_{n+1})$ to the predicted value $V_{ic}$ (DO, the following formula (1) is satisfied;

$$a = \{V_{ic}(D_n) - V_{ic}(D_{n+1})\}/(t_{n+1} - t_n) = \{V_{ic}(D_{n+1}) - V_{ic}(D_x)\}/t_x - t_{n+1} \quad (1)$$

Since $t_{n+1}-t_n=t_x-t_{n+1}$, the formula (1) is deformed into the following formula (2). The prediction unit 420B may calculate the predicted value $V_{ic}$ $(D_x)$ by the formula (2).

$$V_{ic}(D_x)=2V_{ic}(D_{n+1})-V_{ic}(D_n) \quad (2)$$

According to the example calculation described above, the predicted value $V_{ic}$ ($D_x$) is calculated from an approximate function representing a relationship between a plurality of most recent observation values $V_{ic}$ ($D_n$), . . . and a plurality of time points $t_n$, . . . , at which the respective observation values are acquired. Accordingly, the predicted value $V_{ic}$ ($D_x$) can be accurately calculated. Also, the predicted value $V_{ic}$ ($D_x$) can be calculated by a simple calculation since the predicted value $V_{ic}$ ($D_x$) is calculated by using the temporal change rate a of the two most recent observation value $V_{ic}$ ($D_n$) and $V_{ic}$ ($D_{n+1}$) as a temporal change rate from the most recent observation value $V_{ic}$ ($D_{n+1}$) to the predicted value $V_{ic}$ ($D_x$).

Modified Example of the Third Embodiment

A prediction unit 420B of a detection unit 42B in a detection device 4B according to the modified example calculates the subsequent temporal change rate of a predicted value $a_x$ from a history of the temporal change rate $a_n$ of the past digital observation values $V_{ic}$ (D). For example, the prediction unit 420B may calculate an approximate function of relationship between the temporal change rate $a_n$, . . . and the timing $t_n$, . . . from the most recent plurality of observation value $V_{ic}$ (D), . . . and acquiring timing $t_n$, . . . of respective observation value $V_{ic}$ ($D_n$), and may calculate the predicted value $a_x$ of the temporal change rate of the observation value $V_{ic}$ (D) at the subsequent acquiring timing from the approximate function. The detection unit 42B may detect zero cross of the output current $I_c$ based on the result of comparing the predicted value $a_x$ with the threshold value. The threshold value may be the temporal change rate $a_n$ of voltage value $V_{ic}$ ($D_{n-1}$) and $V_{ic}$ ($D_n$)$_{@Ic=0A}$ of the digital value which is continuously acquired in advance at the zero cross point of the output current $I_c$ in the inverter device 1 comprising the detection device 4B, and may be a temporal change rate $a_n$+K to which a tolerance margin K is added. In the modified example, as one example, the detection unit 42A uses at least one of the maximum value and the minimum value of the temporal change rate a of the observation value $V_{ic}$ (D) of digital value as a threshold value. The threshold value may be set separately relative to independent detection device 4B. As one example, the maximum value and/or the minimum value which is measured in advance in characteristic test upon manufacturing the detection device 4B may be set in the detection device 4B. Additionally or alternatively, the detection device 4B may successively update the maximum value and/or the minimum value stored therein by storing the history of the temporal change rate of $V_{ic}$ (D).

According to the above detection device 4B, the zero cross of the output current $I_c$ is detected by using the predicted value $a_x$ of the temporal change rate, and therefore the zero cross detection timing can be advanced comparing to the case in which the zero cross of the output current $I_c$ is detected based on the actually measured value. Also, since the predicted value of the next temporal change rate is calculated from the temporal change rate of the past observation value $V_{ic}$ (D), influence due to an error of the observation value $V_{ic}$ (D) is reduced and the zero cross of the output current $I_c$ can be accurately detected by increasing the number of observation value $V_{ic}$ (D) being used for calculating the predicted value.

Figure 11:
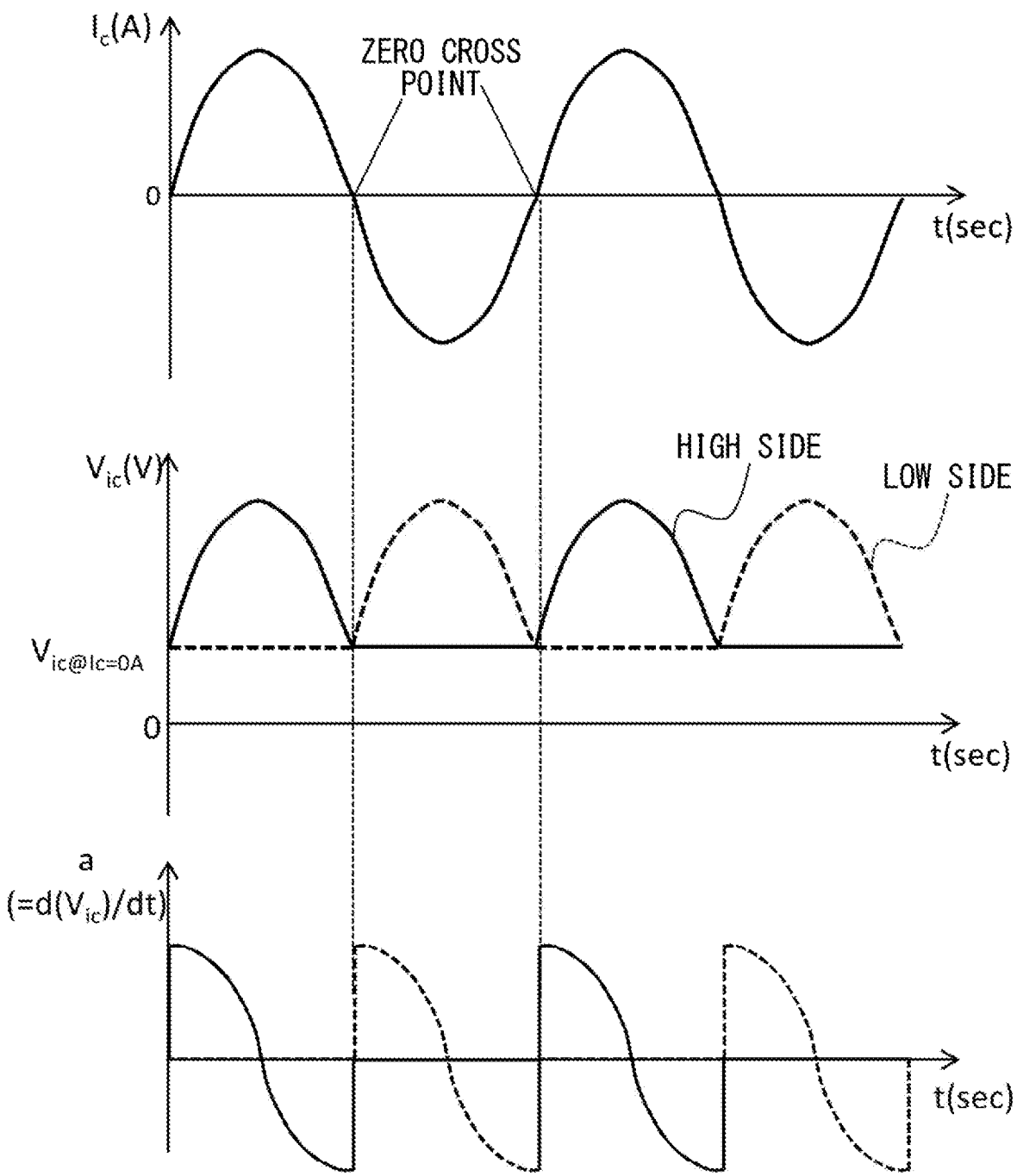
FIG. 11 shows a relationship between the output current, the observation value and the temporal change rate of the observation value.

FIG. 11 shows the relationship among the output current $I_c$ and the observation value $V_{ic}$ and the temporal change rate a of the observation value $V_{ic}$. The graph on the upper part and middle part is the same as FIG. 6. The graph on the lower part shows a temporal change of the temporal change rate a of observation value $V_{ic}$. In the graph, the vertical axis is a temporal change rate a of the observation value $V_{ic}$, and the horizontal axis is time (seconds). As shown in the graph, at the zero cross point of the output current $I_c$, the temporal change rate a of observation value $V_{ic}$ on each of the high side and the low side changes into zero from the maximum value or the minimum value, or into the maximum value or the minimum value from zero. Accordingly, the zero cross of the output current $I_c$ is detected by using at least one of the maximum value and the minimum value of temporal change rate a of observation value $V_{ic}$ (D) as a threshold value.

Another Modified Example

Note that in the above-described embodiments and modified examples, the acquisition unit 41 identifies the Miller period using the identification unit 412 and samples the observation value $V_{ic}$ during the Miller period, however, the observation value $V_{ic}$ may be sampled at the timing at which a predetermined time has elapsed from an On instruction issued for the first switching element 21. The predetermined time may be time from the On instruction to the start of the Miller period. The acquisition unit 41 may set the sampling timing during the Miller period by using a delay circuit which generates a delay by the time from the input of the On instruction.

Figure 12:
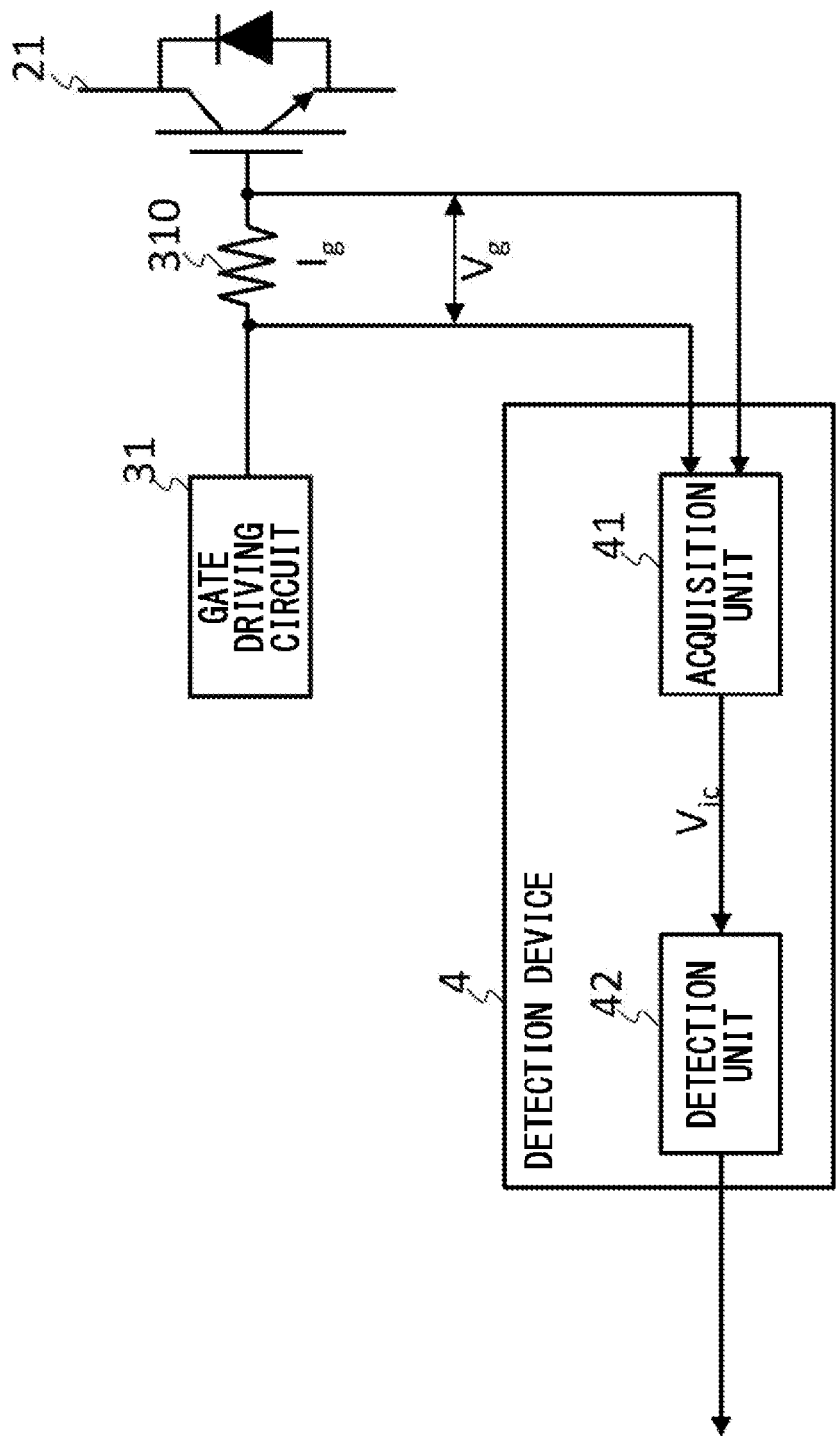
FIG. 12 shows an acquisition unit of a modified example.

Also, while it is described that the acquisition unit 41 acquires the observation value $V_{ic}$ based on the gate voltage $V_g$, the observation value based on the gate current $I_g$ may be also acquired. FIG. 12 shows a modified example of the acquisition unit 41. The acquisition unit 41 may acquire a voltage $V_g$ obtained by converting the gate current $I_g$ by the gate resistance 310 as the observation value $V_{ic}$.

Also, it is described that the first switching element 21 as low side and the second switching element 22 as the high side, the arrangement may be reversed.

Moreover, while it is described that the acquisition unit 41 acquires the gate voltage $V_g$ of the first switching element 21 on the low side or the observation value $V_{ic}$ which is based on the gate current $I_g$, the gate voltage $V_g$ of the second switching element 22 on the high side or the observation value $V_{ic}$ based on the gate current $I_g$ may be acquired alternatively/additionally. In this case, the detection unit 42 may detect whether or not the output current $I_c$ has zero crossed (or is to zero cross) in every switching operation that the second switching element 22 undergoes toward the ON state and/or the OFF state. Note that the acquisition unit 41 may be acquire the observation value $V_{ic}$ after converting the reference potential by using such as insulated transformer since the reference potential of the gate voltage $V_g$ on the high side is high.

Furthermore, although the above description says that the acquisition unit 41 has the buffer circuit 410, the acquisition unit 41 may alternatively include an integration circuit. The integration circuit may integrate the gate voltage $V_g$ at least a part of the Miller period which is identified by the identification unit 412 and supplies the gate voltage $V_g$ to the sampling unit 413. The integration circuit may be a bandpass filter. In this case, the influence of the noise of the gate voltage $V_g$ can be reduced.

Also, while the output value and the target value which is used for feedback control of the control unit 30 is described as a current value, it may be a voltage value.

Also, while it is described that one control device 3 is provided for each phase of the UVW, one may be provided for all three-phases.

Also, while it is described that three-phase AC power is supplied to the switching circuit 2, a single phase AC power may be supplied and DC power may supplied.

Also, while it is described that the inverter device 1 is provided with the detection devices 4, 4A and 4B, another device such as converter device may also be provided with the same.

Various embodiments of the present invention may be described with reference to flowcharts and block diagrams whose blocks may represent (1) steps of processes in which operations are performed or (2) sections of apparatuses responsible for performing operations. Specific steps and sections may be implemented by at least one of a dedicated circuit, a programmable circuit which is supplied together with a computer-readable instruction stored on computer readable medium, and a processor which is supplied together with a computer-readable instruction stored on computer readable medium. The dedicated circuit may include a hardware circuit at least one of digital and analog, and may include at least one of an integrated circuit (IC) and a discrete circuit. Programmable circuitry may include reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), etc.

Computer-readable media may include any tangible device that can store instructions for execution by a suitable device, such that the computer-readable medium having instructions stored therein comprises an article of manufacture including instructions which can be executed to create means for performing operations specified in the flowcharts or block diagrams. Examples of computer-readable media may include an electronic storage medium, a magnetic storage medium, an optical storage medium, an electromagnetic storage medium, a semiconductor storage medium, etc. More specific examples of computer-readable media may include a floppy disk, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a compact disc read-only memory (CD-ROM), a digital versatile disk (DVD), a BLU-RAY® disc, a memory stick, an integrated circuit card, etc.

Computer-readable instructions may include assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, JAVA®, C++, etc., and conventional procedural programming languages, such as the "C" programming language or similar programming languages.

Computer-readable instructions may be provided to a processor of a general purpose computer, special purpose computer, or other programmable data processing apparatus, or to programmable circuitry, locally or via a local area network (LAN), wide area network (WAN) such as the Internet, etc., to execute the computer-readable instructions to create means for performing operations specified in the flowcharts or block diagrams. Examples of processors include computer processors, processing units, microprocessors, digital signal processors, controllers, microcontrollers, etc.

Figure 13:
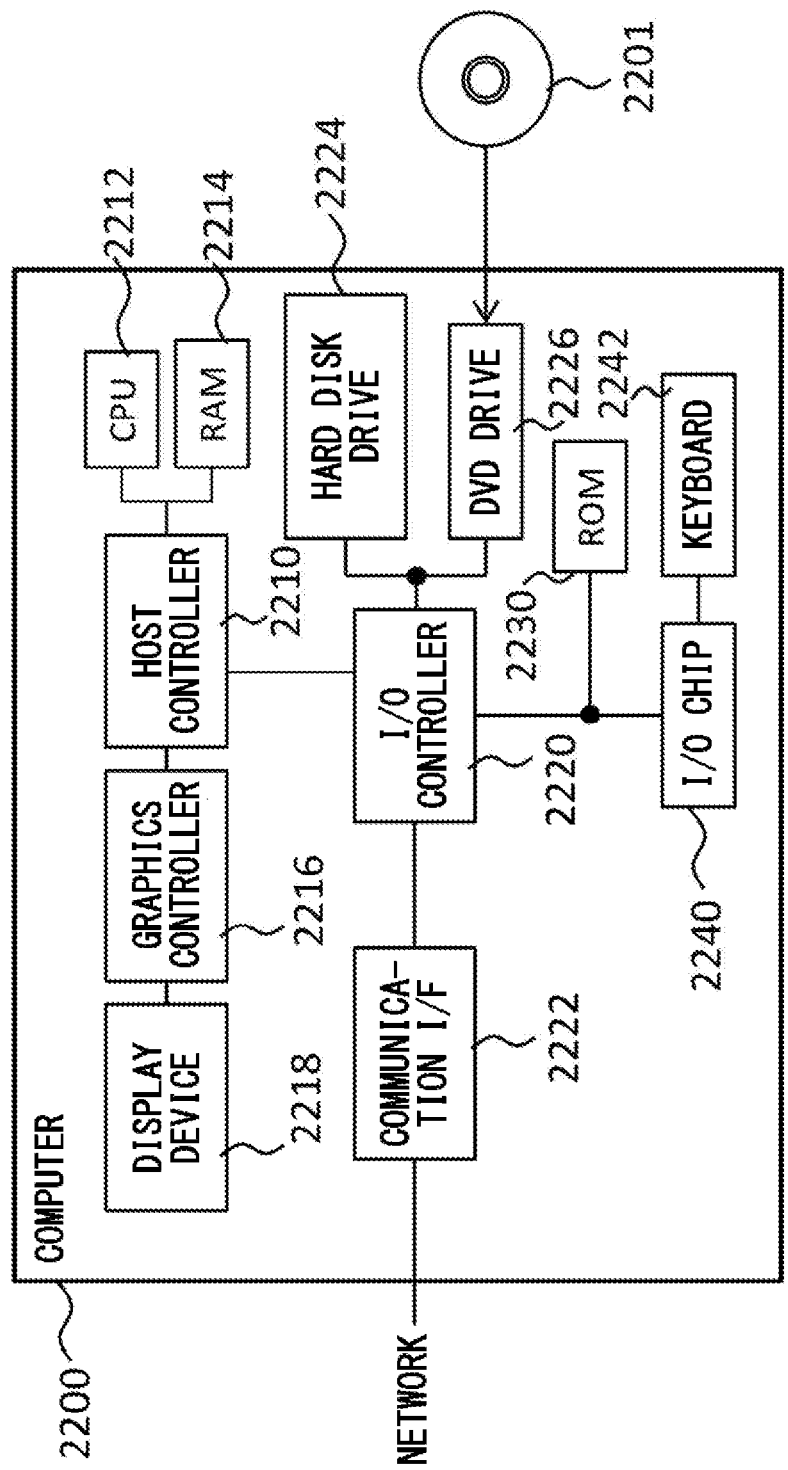
FIG. 13 shows an example of a computer in which some or all of a plurality of aspects of the present invention may be embodied.

FIG. 13 shows an example of a computer 2200 in which aspects of the present invention may be wholly or partly embodied. A program that is installed in the computer 2200 can cause the computer 2200 to function as or perform operations associated with apparatuses of the embodiments of the present invention or one or more sections thereof, and/or cause the computer 2200 to perform processes of the embodiments of the present invention or steps thereof. Such a program may be executed by the CPU 2212 to cause the computer 2200 to perform certain operations associated with some or all of the blocks of flowcharts and block diagrams described herein.

The computer 2200 according to the present embodiment includes a CPU 2212, a RAM 2214, a graphics controller 2216, and a display device 2218, which are mutually connected by a host controller 2210. The computer 2200 also includes input/output units such as a communication interface 2222, a hard disk drive 2224, a DVD-ROM drive 2226 and an IC card drive, which are connected to the host controller 2210 via an input/output controller 2220. The computer also includes legacy input/output units such as a ROM 2230 and a keyboard 2242, which are connected to the input/output controller 2220 through an input/output chip 2240.

The CPU 2212 operates according to programs stored in the ROM 2230 and the RAM 2214, thereby controlling each unit. The graphics controller 2216 obtains image data generated by the CPU 2212 on a frame buffer or the like provided in the RAM 2214 or in itself, and causes the image data to be displayed on the display device 2218.

The communication interface 2222 communicates with another electronic device via network. The hard disk drive 2224 stores programs and data used by the CPU 2212 within the computer 2200. The DVD-ROM drive 2226 reads the programs or the data from the DVD-ROM 2201, and provides the hard disk drive 2224 with the programs or the data via the RAM 2214. IC card drive reads a recording medium storing thereon a program and data from IC card, and additionally or alternatively writes recording medium storing thereon a program and data on the IC card.

ROM 2230 stores at least one of a boot program or the like which is executed by computer 2200 at the time of upon activation, and a program depending on hardware of computer 2200. The input/output chip 2240 may also connect various input/output units via a parallel port, a serial port, a keyboard port, a mouse port, and the like to the input/output controller 2220.

A program is provided by computer readable media such as the DVD-ROM 2201 or the IC card. The program is read from the computer readable media, installed into the hard disk drive 2224, RAM 2214, or ROM 2230, which are also examples of computer readable media, and executed by the CPU 2212. The information processing described in these programs is read into the computer 2200, resulting in cooperation between a program and the above-mentioned various types of hardware resources. An apparatus or method may be constituted by realizing the operation or processing of information in accordance with the usage of the computer 2200.

For example, when communication is performed between the computer 2200 and an external device, the CPU 2212 may execute a communication program loaded onto the RAM 2214 to instruct communication processing to the communication interface 2222, based on the processing described in the communication program. The communication interface 2222, under control of the CPU 2212, reads transmission data stored on a transmission buffering region provided in a recording medium such as the RAM 2214, the hard disk drive 2224, the DVD-ROM 2201, or the IC card, and transmits the read transmission data to a network or writes reception data received from a network to a reception buffering region or the like provided on the recording medium.

In addition, the CPU 2212 may cause all or a necessary portion of a file or a database to be read into the RAM 2214, the file or the database having been stored in an external recording medium such as the hard disk drive 2224, the DVD-ROM drive 2226 (DVD-ROM 2201), the IC card, etc., The CPU 2212 may then write back the processed data to the external recording medium.

Various types of information, such as various types of programs, data, tables, and databases, may be stored in the recording medium to undergo information processing. The CPU 2212 may perform various types of processing on the data read from the RAM 2214, which includes various types of operations, processing of information, condition judging, conditional branch, unconditional branch, search/replace of information, etc., as described throughout this disclosure and designated by an instruction sequence of programs, and writes the result back to the RAM 2214. In addition, the CPU 2212 may search for information in a file, a database, etc., in the recording medium. For example, when a plurality of entries, each having an attribute value of a first attribute associated with an attribute value of a second attribute, are stored in the recording medium, the CPU 2212 may search for an entry matching the condition whose attribute value of the first attribute is designated, from among the plurality of entries, and read the attribute value of the second attribute stored in the entry, thereby obtaining the attribute value of the second attribute associated with the first attribute satisfying the predetermined condition.

The above-explained program or software modules may be stored in the computer readable media on or near the computer 2200. In addition, a recording medium such as a hard disk or a RAM provided in a server system connected to a dedicated communication network or the Internet can be used as the computer readable media, thereby providing the program to the computer 2200 via the network.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

1: inverter device,
2: switching circuit,
3 control device,
4, 4A, 4B detection device,
5 AC power supply,
6 load,
10 rectifying circuit,
11 smoothing capacitor,
13 low-side wire,
14 high-side wire,
21 first switching element,
22 second switching element,
25 output terminal,
30 control unit,
31 gate driving circuit,
33 determination unit,
34 compensation unit,
41 acquisition unit,
42, 42A, 42B detection unit,
43 AD conversion unit,
210 freewheeling diode,
220 freewheeling diode,
300 current sensor,
310 gate resistance,
410 buffer circuit,
411 differentiation unit,
412 identification unit,
413 sampling unit,
420 comparator circuit,
420B prediction unit,
4130 sampling capacitor,
4131 sampling switch,
4132 output buffer,
2200 computer,
2201 DVD-ROM,
2210 host controller,
2212 CPU,
2214 RAM,
2216 graphics controller,
2218 display device,
2220 input/output controller,
2222 communication interface,
2224 hard disk drive,
2226 DVD-ROM drive,
2230 ROM,
2240 input/output chip,
2242 keyboards

What is claimed is:

1. A detection device for detecting zero cross of output current output from a switching circuit having a first switching element and a second switching element connected in series, the detection device comprising:
an acquisition unit which is connected to a gate terminal of at least one switching element of the first switching element and the second switching element, and outputs an observation value that is based on gate current or an observation value that is based on gate voltage of at least one switching element of the first switching element and the second switching element, the observation values being observed during a Miller period in which Miller capacitance between a drain and a gate is charged; and
a detection unit which receives one of the observation value and a converted observation value, and detects, based on the observation value during the Miller period, zero cross timing of output current flowing between an (i) output terminal between the first switching element and the second switching element and (ii) a load connected to the output terminal, the zero cross timing being a timing that the output current is changed from positive to negative or from negative to positive.

2. The detection device according to claim 1, wherein
the switching circuit has the first switching element on a low side and the second switching element on a high side connected in series, and
the acquisition unit outputs the observation value of the first switching element.

3. The detection device according to claim 1, wherein
the detection unit detects the zero cross timing based on a result of comparing the observation value with a threshold value.

4. The detection device according to claim 1, wherein
the at least one switching element undergoes a plurality of switching operations during a variation period of the output current, and
the detection unit detects whether or not the output current has zero crossed in each of two or more of the plurality of switching operations.

5. The detection device according to claim 4, wherein
the detection unit detects, at every switching operation to at least one of an ON state and an OFF state in the at least one switching element, whether or not the output current has zero crossed, or is to zero cross.

6. The detection device according to claim 1, wherein
the acquisition unit samples the observation value at a time point when a predetermined time point has elapsed from an ON instruction to the at least one switching element.

7. A detection device for detecting zero cross of output current output from a switching circuit having a first switching element and a second switching element connected in series, the detection device comprising:
an acquisition unit which acquires an observation value that is based on gate current or an observation value that is based on gate voltage of at least one switching element of the first switching element and the second switching element, the observation values being observed during a Miller period in which Miller capacitance between a drain and a gate is charged; and
a detection unit which detects, based on the observation value during the Miller period, zero cross of output current flowing between an (i) output terminal between the first switching element and the second switching element and (ii) a load connected to the output terminal, wherein
the observation value acquired by the acquisition unit is an analog value, and
the detection device comprises:
an AD conversion unit which converts the analog observation value acquired by the acquisition unit into a digital observation value and supplies the detection unit with the digital observation value.

8. The detection device according to claim 7, wherein
the detection unit detects the zero cross, based on a result of comparing the digital observation value with a predetermined reference value stored therein.

9. The detection device according to claim 7, wherein
the detection unit:
comprises a prediction unit which calculates a predicted value of a subsequent digital observation value from a history of past digital observation values; and
detects the zero cross based on a result of comparing the predicted value with a threshold value.

10. The detection device according to claim 9, wherein
the prediction unit calculates the predicted value from an approximate function representing a relationship between a plurality of most recent digital observation values and a plurality of time points at which the respective observation values are acquired.

11. The detection device according to claim 9, wherein
the prediction unit calculates the predicted value by using a temporal change rate between two most recent digital observation values as a temporal change rate from a most recent digital observation value to the predicted value.

12. The detection device according to the claim 7, wherein
the detection unit:
comprises a prediction unit which calculates a predicted value of a subsequent temporal change rate from a history of temporal change rates of past digital observation values; and
detects the zero cross based on a result of comparing the predicted value with a threshold value.

13. The detection device according to claim 12, wherein
the detection unit uses at least one of a maximum value and a minimum value of the temporal change rate of the digital observation value as the threshold value.

14. A detection device for detecting zero cross of output current output from a switching circuit having a first switching element and a second switching element connected in series, the detection device comprising:
an acquisition unit which acquires an observation value that is based on gate current or an observation value that is based on gate voltage of at least one switching element of the first switching element and the second switching element, the observation values being observed during a Miller period in which Miller capacitance between a drain and a gate is charged; and
a detection unit which detects, based on the observation value during the Miller period, zero cross of output current flowing between an (i) output terminal between the first switching element and the second switching element and (ii) a load connected to the output terminal, wherein
the acquisition unit comprises:
an identification unit which identifies the Miller period; and
a sampling unit which samples the observation value during the Miller period.

15. The detection device according to claim 14, wherein
the sampling unit comprises:
a sampling capacitor which accumulates the observation value;
a sampling switch which establishes connection, between a terminal which outputs the observation value and the sampling capacitor during the Miller period, and disrupts, in a period other than the Miller period, the connection between the terminal which outputs the observation value and the sampling capacitor; and
an output buffer which outputs the observation value accumulated in the sampling capacitor to the detection unit.

16. The detection device according to claim 14, wherein
the acquisition unit comprises:
a differentiation unit which differentiates the gate voltage or the gate current; wherein
the identification unit which identifies the Miller period based on a differential value of the gate voltage or the gate current.

17. A control device comprising:
the detection device for detecting zero cross of output current output from a switching circuit having a first switching element and a second switching element connected in series, the detection device comprising:

an acquisition unit which is connected to a gate terminal of at least one switching element of the first switching element and the second switching element, and outputs an observation value that is based on gate current or an observation value that is based on gate voltage of at least one switching element of the first switching element and the second switching element, the observation values being observed during a Miller period in which Miller capacitance between a drain and a gate is charged; and a detection unit which receives one of the observation value and a converted observation value, and detects, based on the observation value during the Miller period, zero cross of output current flowing between an (i) output terminal between the first switching element and the second switching element and (ii) a load connected to the output terminal;

a determination unit which determines whether the output current is positive or negative according to a time point of the zero cross detected by the detection device;

a control unit which controls switching operations of the switching circuit; and a compensation unit which compensates for dead time of the switching circuit according to whether the output current is positive or negative.

18. The control device according to claim 17, wherein the switching circuit has a first switching element on the low side and the second switching element on a high side connected in series, and the compensation unit:

increases an ON period of the first switching element and an OFF period of the second switching element in response to the output current having been determined to be positive; and increases an OFF period of the first switching element and an ON period of the second switching element in response to the output current having been determined to be negative.

19. The control device according to claim 17, wherein the control unit controls the switching circuit by PWM control in such a manner that an output value of the output terminal approaches a target value, and the compensation unit:

relatively increases the target value by a dead time compensation value relative to the output value in response to the output current having been determined to be positive; and relatively decreases the target value by the dead time compensation value relative to the output value in response to the output current having been determined to be negative.

20. An inverter device comprising:

the control device according to claim 17; and the switching circuit.

* * * * *